United States Patent [19]

Wang

[11] Patent Number: 5,618,500

[45] Date of Patent: Apr. 8, 1997

[54] CONSTITUENTS OF ENGINE EXHAUST

[76] Inventor: Chi-Shang Wang, 5923 Fairmount Dr., Woodridge, Ill. 60517

[21] Appl. No.: 517,345

[22] Filed: Aug. 21, 1995

[51] Int. Cl.$^6$ .............................. B01D 53/34; F01N 3/10
[52] U.S. Cl. ...................... 422/177; 422/171; 422/172; 422/173; 422/174; 422/179; 422/199; 422/211; 422/221
[58] Field of Search ........................... 422/168, 171, 422/172, 173, 175, 177, 221, 179, 180, 199; 502/439, 527; 60/289

[56] References Cited

U.S. PATENT DOCUMENTS

| 2,898,202 | 8/1959 | Houdry et al. | 422/172 |
|---|---|---|---|
| 3,733,181 | 5/1973 | Tourtellotte et al. | 422/172 |
| 3,799,748 | 3/1974 | Scheitlin et al. | 422/171 |
| 4,069,157 | 1/1978 | Hoover et al. | 210/433 M |
| 4,199,477 | 4/1980 | Hegedos | 252/450 |
| 4,208,454 | 6/1980 | Reed et al. | 427/238 |
| 4,308,233 | 12/1981 | Narumiya et al. | 422/180 |
| 5,106,588 | 4/1992 | Sims et al. | 422/180 |

OTHER PUBLICATIONS

A. P. Green, "Inform Vacuum Formed Ceramic Fiber Shapes" no date.
Ashleys. "Reducing Tailpipe Emissions with Catalytic Converters", Mechanical Engineer, Nov. 1994.
C.P. Garner and J.C. Dent, "Particular Matter Emission Characteristics under Transient Driving Conditions", Saetechnical Paper 890174.
Lachman, I.M. and R.N. McVally, "Monolithic Honeycomb Supports for Catalysis," CEP Jan. 1985.
Lucchesi, R.P., "Fuel Effects on Emission From two Electically Heated Catalyst Equipped Vehicles", SAE Technical Paper 932760, 1993.

Primary Examiner—Robert J. Warden
Assistant Examiner—Hien Tran
Attorney, Agent, or Firm—Philip H. Kier

[57] ABSTRACT

A reactor that can be attached to the exhaust manifold of a diesel or gasoline engine, or other internal combustion engines such as a jet engine or a gas turbine to oxidize and burn carbon soot particles, carbon monoxide, and unburned hydrocarbons, and to dissociate nitrogen and sulfur oxides. The reactor has a reaction zone that contains porous heat-retaining foam cells and that is bounded by a porous heat-retaining zone, which in turn is surrounded by ceramic insulation materials to minimize energy losses. Engine exhaust at elevated temperatures and containing some oxygen (air) enters the reaction chamber. By means of impinging heat transfer, thermal radiation enhancement, energy trapping and combustion of engine emissions, temperatures sufficient to oxidize carbon soot particles, carbon monoxide, and unburned hydrocarbons are attained. Harmless product of the oxidation reactions, $H_2O$ and $CO_2$ are released from the reactor.

11 Claims, 4 Drawing Sheets

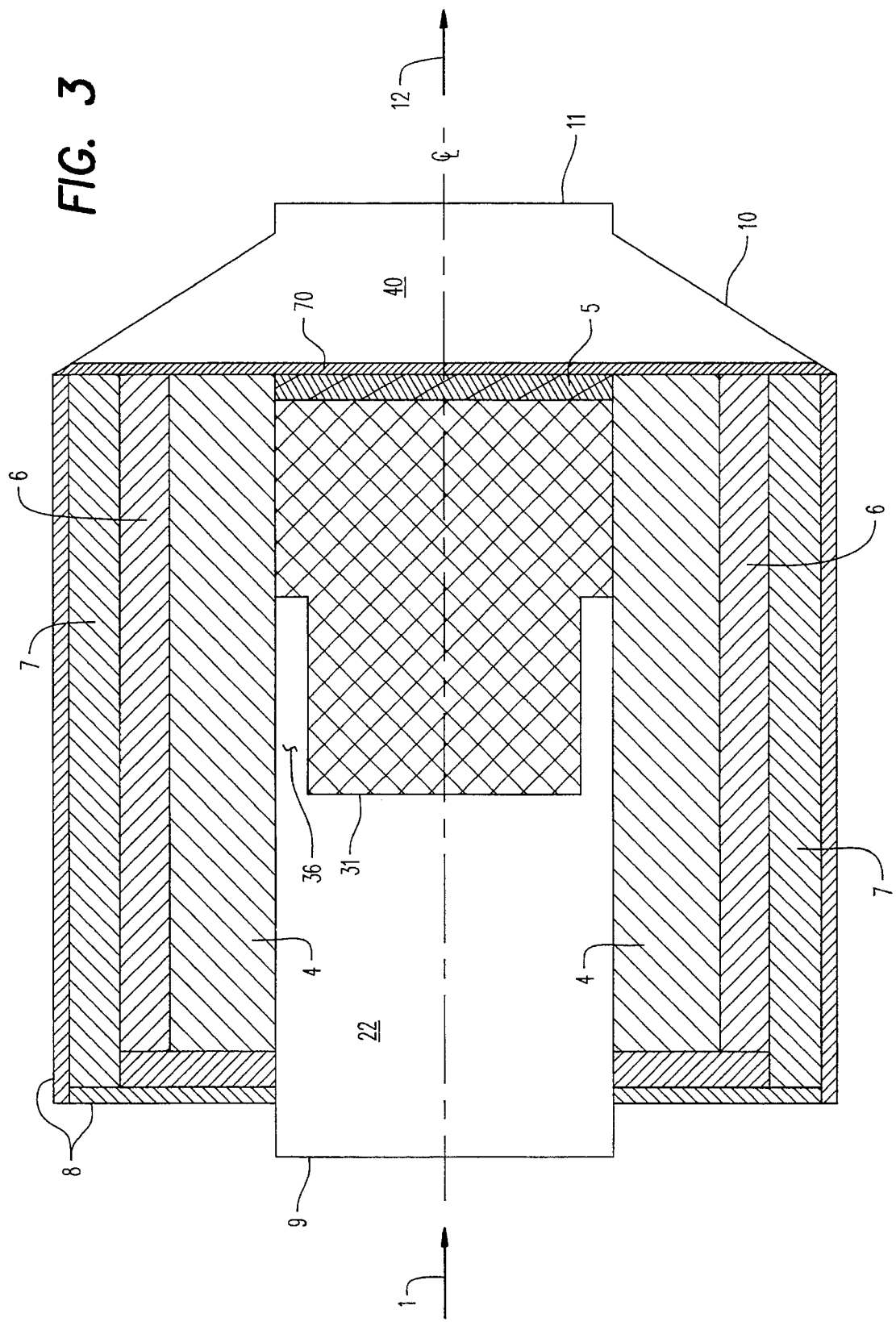

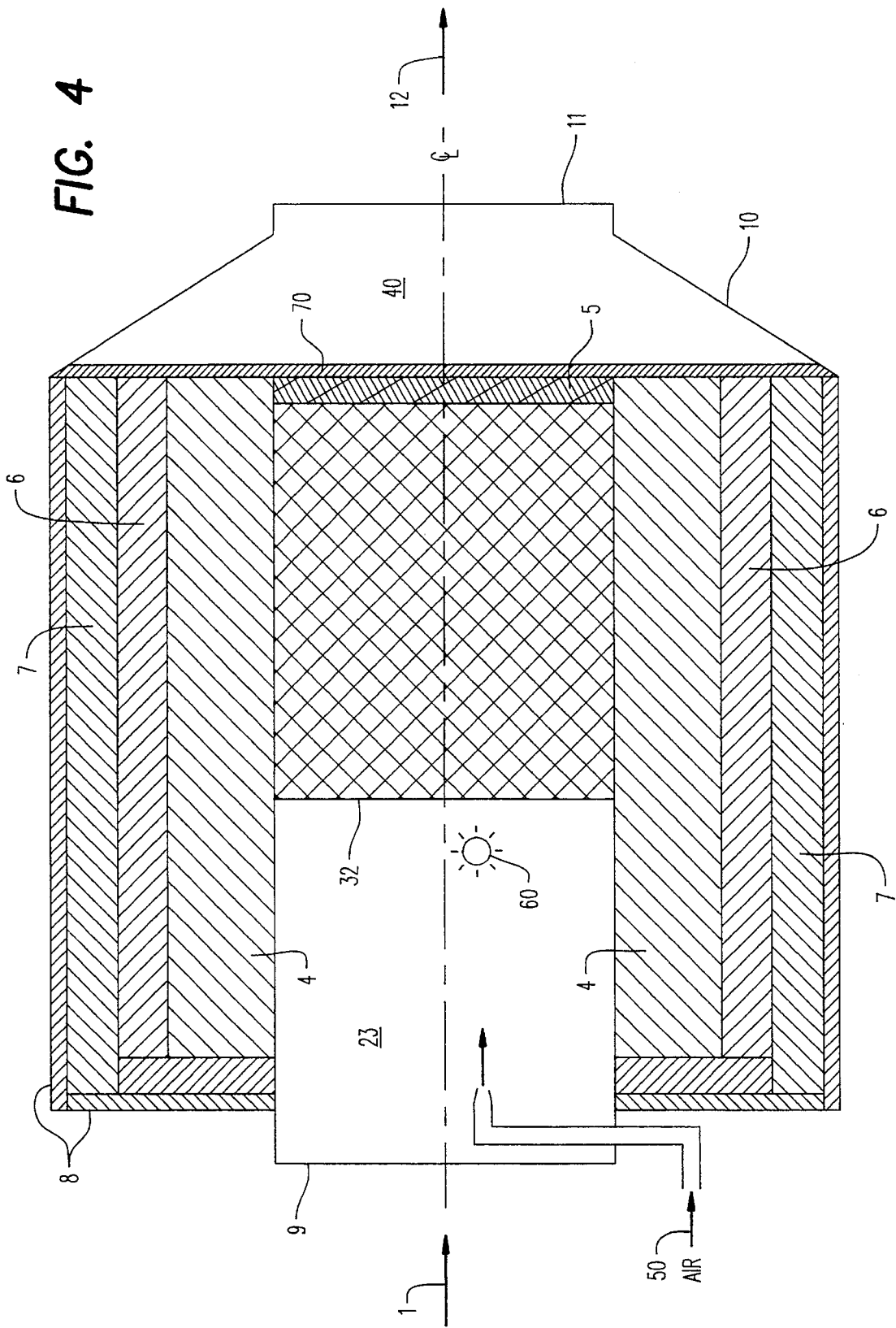

CONSTITUENTS OF ENGINE EXHAUST

BACKGROUND OF THE INVENTION

The present invention is a reactor that removes noxious vehicle engine exhausts, such as smoke, soot particles, unburned hydrocarbons, carbon monoxide, and nitrogen oxides ($NO_x$) prior to release to the atmosphere. The final product released to the atmosphere contains only water vapor, carbon dioxide, and clean exhaust gases. It accomplishes this by recovering the exhaust heat from internal combustion engines; utilizing the exhaust emissions as fuels to generate additional combustion energy; applying thermal radiation enhancement, impinging heat transfer and energy trapping to achieve a high temperature environment of up to 800° C., or above; and using state-of-the-art insulation materials to minimize energy losses to the surroundings.

Health and environmental concerns with automobile emissions have resulted in increasingly stringent and restrictive vehicle emission standards for hydrocarbons, carbon monoxide, $NO_x$, and particulates such as soot and smog. Soot, or smoke, is basically a carbon particle from heating of lubricants or from agglomeration and dehydrogenation of hydrocarbon fuels during combustion processes. Smog is basically a mixture of soot, water vapor, and unburnt fuel. Soot-laden black smoke is readily observed being emitted from exhaust pipes of large trucks powered by diesel engines. However, when filters are used to reduce soot and smoke emissions, some studies show that engine particulate filters or traps collect only 60–90% of the particles. The retained particles progressively block the flow passage and increase back pressures, thus causing reduced engine output power and fuel economy.

For typical gasoline engines, the engine outlet temperature is in the range of 320°–370° C. and the temperature of the exhaust after leaving the catalytic converter is in the range of 540°–650° C. For gasoline engines, oxygen content in the exhaust is about 1% because of incomplete combustion. Unburned hydrocarbons and carbon monoxide in the presence of 1% oxygen can be oxidized at temperatures in excess of 300° C. to 350° C. Sustaining temperatures in excess of 400° C. before gasoline engine exhaust is released to the atmosphere will reduce emissions of unburned hydrocarbons, carbon monoxide, and $NO_x$.

The maximum engine outlet temperature from diesel engines can be as high as 800° C. The oxygen content at exhaust is about 10–12% because of turbocharging at an air/fuel ratio as high as 25% excess air. Soot oxidizes slowly at 300° C. and rapidly at 400° C. in air or gas mixtures containing 10% oxygen. Also soot burns from diesel exhaust filters if temperatures in the vicinity of 540° C. are reached in the presence of adequate oxygen. Therefore, sustaining diesel engines exhaust temperatures in excess of 400° C. with an oxygen content of about 10% will enhance oxidation of soot particles, thereby reducing releases of soot to the atmosphere.

A recognized problem for catalytic converters in use with gasoline engines as reported by Ashley in *Mechanical Engineering* in November 1994 is that from 60% to 85% of the hydrocarbon emissions are generated during the first 200 seconds following cold startup. This is because catalytic converters cannot efficiently remove these pollutants until they attain their effective operating temperature of 300° C. or greater.

SUMMARY OF THE INVENTION

The present invention is a reactor that can be located along the exhaust manifold of an internal combustion engine, such as a diesel engine, gasoline engine, jet engine, or gas turbine. Combustion exhaust, which may contain soot particles, unburned hydrocarbon fuel, carbon dioxide, carbon monoxide, water vapor, nitrogen oxides, and air is directed into a reaction zone. The engine and reactor may be mounted on a vehicle or may be stationary mounted. The reaction zone is surrounded by ceramic foam cells, a ceramic wall, and insulation material. These insulators minimize the loss of energy from the reaction zone and from the reactor itself. The reaction zone and ceramic foam cells are configured so that several heat transfer processes (conduction, convection, and radiation) combine to "trap" energy in the reaction zone and attain temperatures sufficiently high to oxidize soot particles, hydrocarbons, and carbon monoxide, and dissociate noxious emissions such as $NO_x$ and $SO_x$. These oxidation reactions are exothermic so that heat is generated in the reaction zone, and is trapped there, so that the temperatures needed for oxidation are sustained. Further heat is generated in the reaction zone from burning (combustion) of unburned hydrocarbons in the engine exhaust so that temperatures are attained in excess of the exhaust temperature when it enters the reaction zone.

Incoming particle-laden exhaust contacts the porous ceramic foam cells and the particles (soot) are deposited on the porous ceramic foam surfaces transferring heat through impinging heat transfer. The particles are heated by conduction from the porous ceramic foam, by the heat trapped in the reaction zone through convection and radiation, and by the heat generated from combustion of the unburned hydrocarbons. The deposited carbon particles are oxidized and burned in the presence of the oxygen in the exhaust to toxic carbon monoxide. The carbon monoxide is in turn oxidized to harmless carbon dioxide in the reactor. The oxidation and combustion of these deposited carbon particles also releases energy, and in turn increase the reactor temperature.

The present invention has several objectives. First, it uses an engine's own waste energy and the energy generated from the combustion of the engine's own emissions to destroy undesirable constituents of the engine's exhaust and to act as a second combustor. Second, because the reactor retains heat for several hours after the engine is shutdown, there is more efficient restart of the engine during the interval that the reactor is at above-ambient temperatures. The reactor also reduces the duration of the cold-start period from approximately 200 seconds to approximately 100 seconds because of its heat retention properties and its trapping of particulates in the exhaust in the reactor. These effects result in less energy consumption and lower hydrocarbon, smoke, and soot emissions. Third, the reactor does not increase operations and maintenance needs—it does not have moving parts; it does not require catalyst converters; it does not require change in the engine combustion process (such as throttling); no filter or trap (which may block the exhaust system, or reduce engine power or fuel economy) is needed; it does not require external oxygen or energy sources for current vehicle designs (although an embodiment is disclosed and claimed that uses external sources of energy and air); neither cleaning nor regeneration is required; a control system is not required; and the reactor is not noisy.

BRIEF DESCRIPTION OF THE DRAWINGS

FIG. 3 is a cross sectional view of an embodiment for a compromise between long retention times and thermal radiation enhancement.

FIG. 4 is a cross sectional view of an embodiment with assisted air and energy sources.

DETAILED DESCRIPTION OF THE PREFERRED EMBODIMENT

Figure 1:
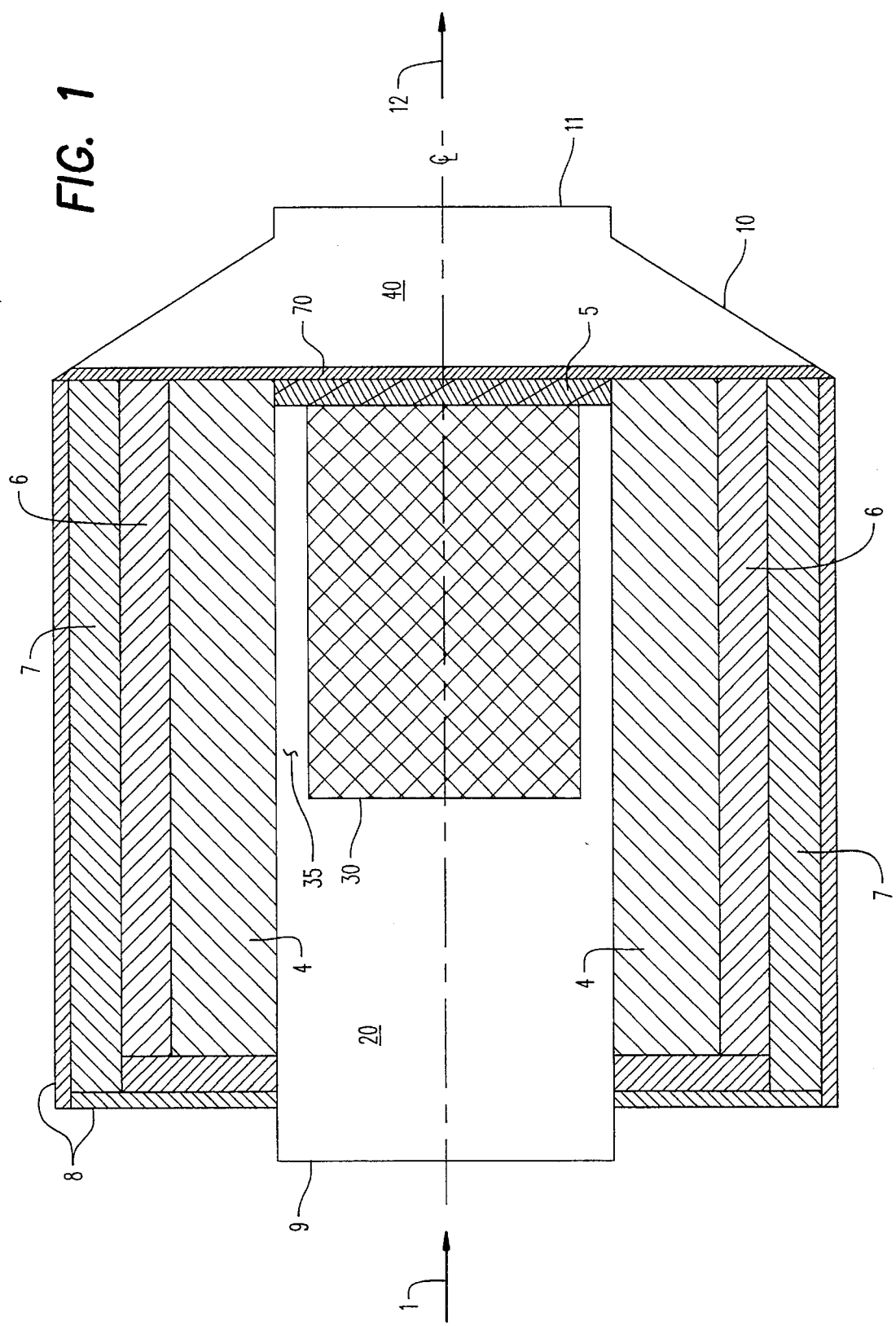
FIG. 1 is a cross sectional view of an embodiment that emphasizes thermal radiation enhancement for promoting oxidation and burning of the engine exhaust constituents.

With reference to FIG. 1, engine exhaust 1 typically containing combustion products including smoke, soot particles, unburned hydrocarbons (fuel), carbon dioxide, carbon monoxide, water vapor, nitrogen oxides ($NO_x$) enter the present invention through inlet pipe 9 at high temperature. The inlet pipe leads directly into a reaction zone 20. The reaction zone has lateral surfaces bordered by porous heat-retaining zone 4. More specifically, the porous heat-retaining zone may be constructed of reticulated foam cells of ceramic materials such as zirconia, mullite, silica, alumina, cordierite, or lava; ceramic oxides of these ceramic materials; combinations of the ceramic materials or of their oxides; or these combinations washcoated with high purity alumina, titania, or zeolites. The surface of the reaction zone opposite from the inlet pipe is bordered an impervious ceramic wall disk 5. Attached to the impervious ceramic wall disk 5 and extending into the reaction zone 20, are ceramic foam cells 30, which could be made of the same materials as the porous heat-retaining zone. The porous materials 4 and 30 serve three functions: (1) as energy-retaining media, (2) as sites for filtering and deposition of soot particles, and (3) for prolonging the retention time of exhaust in the reactor.

In the embodiment shown in FIG. 1, there is a niche 35 between the porous heat-retaining zone 4 and the porous ceramic foam cells 30. The porous heat-retaining zone is within an impervious ceramic wall 6, which in turn is bordered by an outer insulating region 7, such as vacuum form ceramic fibers, ceramic fiber blankets, or refractory fibers. The impervious ceramic wall disk 5 and the impervious ceramic wall may be ceramic materials such as zirconia, mullite, silica, alumina, cordierite, or lava; ceramic oxides of these ceramic materials; combinations of the ceramic materials or of their oxides; combinations of metals and ceramics; or magnesia or calcia stabilized or partially-stabilized ceramics. The reactor has a metal casing 8.

With the terminology that the inlet to the reactor is the bottom of the reactor and the outlet area is the top, the top of the reactor is a metal enclosure 10 and a metal outlet pipe 11. Bordering top of the impervious ceramic wall disk 5, reaction chamber 20, porous heat-retaining zone 4, impervious ceramic wall 6, and outer insulating region 7 is a metal net mesh 70. Contained between the metal net mesh 70 and the stainless steel enclosure is an outer chamber 40. The metal components are typically stainless steel or a high-temperature alloy.

Most of incoming particle-laden exhaust flow 1 entering the reaction zone 20 impinges on the porous ceramic foam cells 30 and distributes to the niche 35. Some of the incoming flow directly passes into the niche 35 where it mixes with the distributed flow there and then passes through the porous heat-retaining zone 4. Because the porous heat-retaining zone is bordered by the impervious ceramic wall 6, flow from the porous heat-retaining zone is through the metal net mesh 70 into the outer chamber 40 and then out of the reactor through the outlet pipe 11.

In the reaction zone 20 several processes act to create sufficiently high temperatures to oxidize and burn soot particles, hydrocarbons, and carbon monoxide, and dissociates noxious emissions such as $NO_x$ and $SO_x$. When the incoming particle-laden exhaust flow 1 contacts the porous heat-retaining material in zone 4 and cells 30, particles are deposited on these surfaces and heat is conducted to these surfaces through impinging heat transfer and conduction. These surfaces, in turn emit heat through radiation, and the hot exhaust transfers heat through convection. As the reaction zone is surrounded by insulating material, the heat generated by the above processes is retained in the reaction zone, with some losses, and temperatures sufficient to oxidize and burn the carbon soot particles, unburned hydrocarbon fuel, and carbon monoxide are attained and the gaseous product leaves the surfaces of the porous zone 4 and cells 30. Oxidation and burning (combustion) of the soot particles, unburnt hydrocarbons, and carbon monoxide are exothermic reactions whose heat releases help attain the high temperatures needed to sustain these oxidation and combustion processes. The final products 12 released from the outlet pipe include carbon dioxide, water vapor, and other clean exhaust gases.

Figure 2:
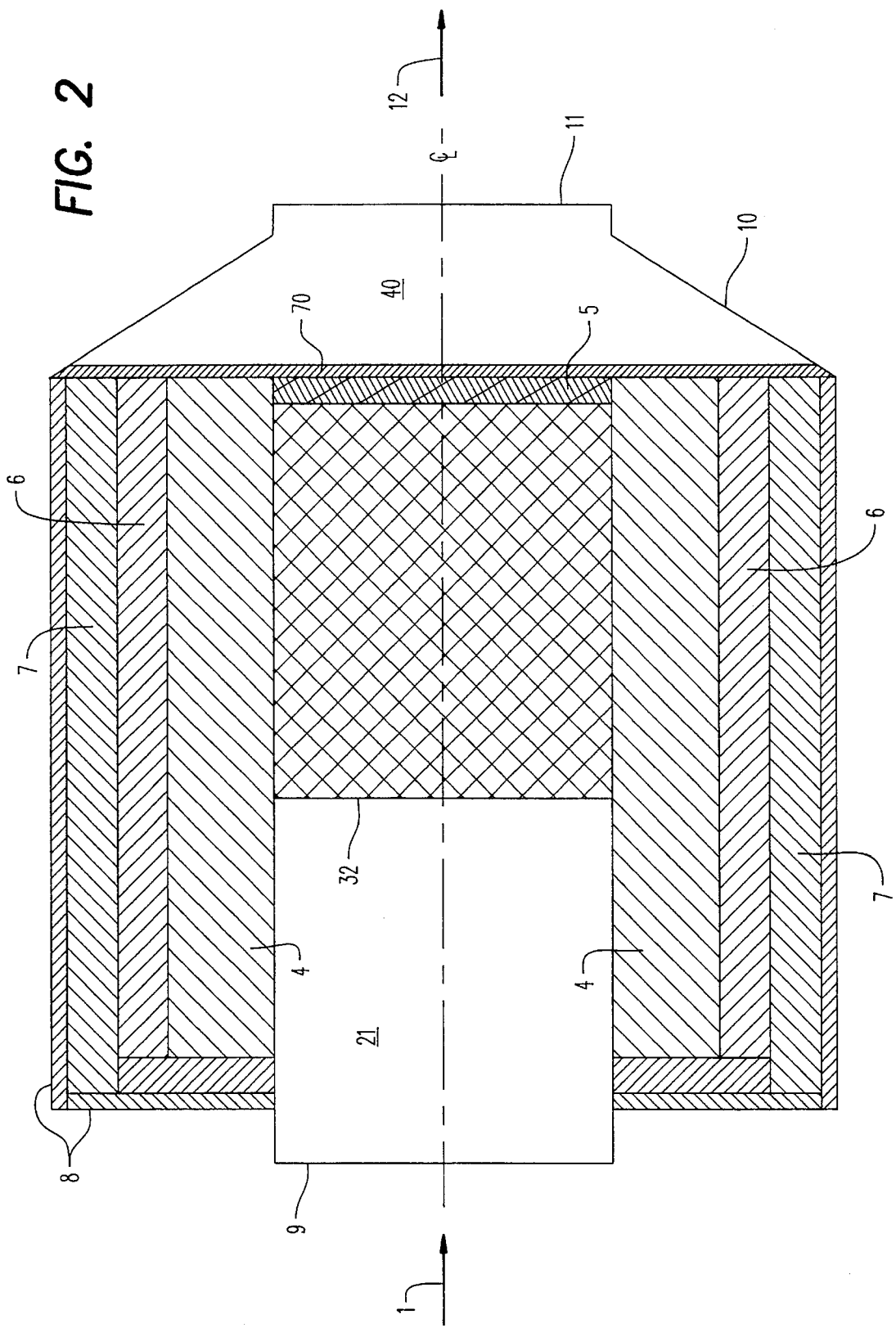
FIG. 2 is a cross sectional view of an embodiment that emphasizes long retention times for promoting oxidation and burning of the engine exhaust constituents.

The embodiments shown in FIG. 2 and FIG. 3 differ from the embodiment shown in FIG. 1 as to the extend of the porous foam cells 30. In the embodiment shown in FIG. 2, the porous ceramic foam cells 32 contact the porous heat-retaining zone 4 for the entire length of the porous ceramic cells. This eliminates the niche 35 shown in FIG. 1., so that reaction zone 21 does not have a niche. The niche has the effect of enhancing temperature in that part of the reaction zone 20 through radiative heat transfer from the surfaces of the porous ceramic foam zone and cells; however, the niche also offered no resistance to transport of the exhaust flow and reduces retention time within the reaction zone. Thus, the embodiment shown in FIG. 2 results in greater retention time at the expense of loss of some shape-related thermal radiation enhancement as compared to the embodiment shown in FIG. 1

In the embodiment shown in FIG. 3, the porous ceramic foam cells 31 contact the porous heat-retaining zone 4 for part of, but not all of the length of the porous ceramic foam cells 31. This results in niche 36 in reaction zone 22 between the porous ceramic foam cells and porous heat-retaining zone that is shorter than the niche 35 in the embodiment shown in FIG. 1. This embodiment is a compromise between retention time and shape-related thermal radiation enhancement.

The oxygen (air) content of engine exhaust and its temperature are sufficient for the reactor to operate efficiently under normal operating conditions. However, for certain upset conditions arising from engine loads or to account for future engine development involving low oxygen content (e.g., from not using turbochargers) or low outlet temperatures (e.g., fuel is burned at local areas near the fuel injector, a lean-burn engine), an external energy source or an external source of oxygen (air) may be needed for efficient oxidation and dissociation to occur. FIG. 4 shows an embodiment similar to the embodiment shown in FIG. 2, except for an external source of air 50 and an energy source 60 located in the reaction zone 23. The use of external sources of energy or air is not limited to a variation on the embodiment shown in FIG. 2, but is as readily applicable to the embodiments shown in FIG. 1 and FIG. 3. The energy source could be an electrical source powered from a battery or from utility electricity, or could be solar energy, or could be petroleum-fueled energy directly from a fuel tank.

I claim:

1. A reactor for the oxidation and combustion of carbon soot particles, unburned hydrocarbons, carbon monoxide, and for the dissociation of nitrogen oxides and sulfur oxides in engine exhaust containing oxygen, said reactor comprising a metal casing containing:

a central reaction zone where exothermal oxidation and combustion of engine exhaust and formation of decomposition products occurs, such oxidation and combustion being sustained by heat of the exhaust and heat released in exothermal oxidation and combustion of the exhaust;

an inlet pipe that introduces engine exhaust into the central reaction zone;

a porous heat-retaining zone defining laterally the central reaction zone, the porous heat-retaining zone allowing passage of engine exhaust and decomposition products;

an impervious insulating plate bordering the central reaction zone opposite to said inlet pipe;

porous heat-retaining cells in the central reaction zone adjacent to said impervious insulating plate for deposit and combustion of soot particles, the porous heat-retaining cell occupying only part of the central reaction zone, impinging heat transfer occurring where the soot particles are deposited;

insulating means adjacent to and external to the porous heat-retaining zone for minimizing energy losses from the porous heat-retaining zone;

a metal net mesh adjacent to the impervious insulating plate, the porous heat-retaining zone, and the insulating means, that allows passage of engine exhaust and decomposition products;

the metal casing being penetrated by the inlet pipe and a metal outlet pipe, and the metal casing being shaped to allow space between the metal net mesh and the outlet pipe.

2. A reactor as set forth in claim 1 wherein the insulating means is a ceramic wall interior to an outer insulating region.

3. A reactor as set forth in claim 2 wherein the porous heat-retaining zone and the porous heat-retaining cells contain material selected from the group consisting of reticulated foam cells of ceramic materials of zirconia, mullite, silica, alumina, cordierite, or lava; ceramic oxides of these ceramic materials; combinations of the ceramic materials or of their oxides; and these combinations washcoated with high purity alumina, titania, or zeolites, said ceramic wall and said impervious insulating plate are a ceramic material; and outer insulating region contains ceramic fibers.

4. A reactor as set forth in claim 3 wherein the impervious insulating plate and the insulating ceramic wall contain material selected from the group consisting of ceramic materials of zirconia, mullite, silica, alumina, cordierite, or lava; ceramic oxides of these ceramic materials; combinations of the ceramic materials or of their oxides; combinations of metals and ceramics; and magnesia or calcia stabilized or partially-stabilized ceramics.

5. A reactor as set forth in claim 4 wherein said outer insulating region contain material selected from the group consisting of vacuum form ceramic fibers, ceramic fiber blankets, and refractory fibers, and wherein the metal casing, metal net mesh, inlet pipe, and outlet pipe are made of stainless steel.

6. A reactor as set forth in claim 5 wherein the porous heat-retaining zone and the porous heat-retaining cells are in contact.

7. A reactor as set forth in claim 5 wherein the porous heat-retaining zone and the porous heat-retaining cells are not in contact.

8. A reactor as set forth in claim 2 further comprising means for adding air to the central reaction zone.

9. A reactor as set forth in claim 2 wherein the central reaction zone contains an energy source.

10. A reactor as set forth in claim 9 wherein the energy source comprises petroleum-fueled energy source.

11. A reactor as set forth in claim 9 wherein the energy source comprises an electrical energy source.

* * * * *